(12) United States Patent
Kojima

(10) Patent No.: US 9,511,736 B2
(45) Date of Patent: Dec. 6, 2016

(54) AIRBAG APPARATUS

(71) Applicant: TOYODA GOSEI CO., LTD., Kiyosu-shi, Aichi-ken (JP)

(72) Inventor: Takahiro Kojima, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/615,667

(22) Filed: Feb. 6, 2015

(65) Prior Publication Data
US 2015/0266443 A1   Sep. 24, 2015

(30) Foreign Application Priority Data

Mar. 19, 2014   (JP) ................. 2014-056771

(51) Int. Cl.
*B60R 21/217*   (2011.01)
*B60R 21/206*   (2011.01)

(52) U.S. Cl.
CPC .......... *B60R 21/217* (2013.01); *B60R 21/206* (2013.01); *B60R 21/2171* (2013.01)

(58) Field of Classification Search
CPC ... B60R 21/217; B60R 21/2171; B60R 21/206
See application file for complete search history.

(56) References Cited

U.S. PATENT DOCUMENTS

| | | | | |
|---|---|---|---|---|
| 6,161,862 A | * | 12/2000 | Rose | B60R 21/2171 280/728.2 |
| 6,161,865 A | * | 12/2000 | Rose | B60R 21/261 280/728.2 |
| 2005/0052009 A1 | * | 3/2005 | Abe | B60R 21/206 280/743.1 |
| 2007/0200322 A1 | * | 8/2007 | Sakakida | B60R 21/206 280/730.1 |

FOREIGN PATENT DOCUMENTS

| | | | |
|---|---|---|---|
| JP | 2007-8471 A | | 1/2007 |
| JP | 2011046259 A | * | 3/2011 |
| JP | 2013-71567 A | | 4/2013 |

* cited by examiner

*Primary Examiner* — Darlene P Condra
(74) *Attorney, Agent, or Firm* — Posz Law Group, PLC

(57) ABSTRACT

In an airbag apparatus, a case includes a peripheral wall portion and a protruding opening. An airbag cover includes a door portion covering the protruding opening, and four side wall portions protruding from the door portion. The peripheral wall portion includes two locking wall portions and two connection wall portions connecting the two locking wall portions to each other. A first pair of the four side wall portions are arranged on outer peripheral sides of the locking wall portions. The first pair of the four side wall portions have a locking hole locked by a locking claw on the locking wall portions. A second pair of the four side wall portions cover an inner peripheral side of the peripheral wall portion located at vicinities of corner portions of a peripheral edge of the protruding opening.

5 Claims, 13 Drawing Sheets

AIRBAG APPARATUS

CROSS-REFERENCE TO RELATED APPLICATIONS

This application claims the benefit of Japanese Patent Application No. 2014-056771 (filed on Mar. 19, 2014), the entire contents of which are incorporated herein by reference.

BACKGROUND

1. Technical Field

The present invention relates to an airbag apparatus including a case, an airbag folded and received in the case, and an airbag cover for covering the folded airbag.

2. Related Art

In an airbag apparatus described in Patent Document 1, an airbag cover arranged to cover a protruding opening of a box-shaped case with a folded airbag received therein has four side walls. The four side walls extend from a peripheral edge of a door portion, which covers the protruding opening, and are arranged on an outer peripheral side of a peripheral wall portion of the case. Two of four the side walls opposing to each other as attaching wall portions are attached to the peripheral wall portion of the case.

In an airbag apparatus described in Patent Document 2, an upper side wall of side walls of an airbag cover is arranged on an inner peripheral side of a peripheral wall portion of a case.

Patent Document 1: JP-A-2013-071567
Patent Document 2: JP-A-2007-008471

In the airbag apparatus described in Patent Document 1, there is no member intended to cover an inner peripheral side of the peripheral wall portion of the case, and therefore, a inflating airbag is likely to come in contact with vicinities of corner portions of a peripheral edge of the protruding opening of the case. In the airbag apparatus described in Patent Document 2, a part of the inner peripheral side of the peripheral wall portion of the case is covered with the side wall of the airbag cover. However, the side wall is attached to the case by being fastened together with an inflator, thereby causing an operation of mounting the airbag cover to the case to be difficult.

SUMMARY

One or more embodiments of the invention provide an airbag apparatus in which an inflating airbag can be inhibited from coming in contact with vicinities of corner portions of a peripheral edge of a protruding opening of a case, and also an airbag cover can be easily mounted on the case.

In accordance with one or more embodiments, an airbag apparatus is provided with a case, an airbag folded and received in the case, and an airbag cover that covers the folded airbag. The case has a box shape including a bottom wall portion, a tubular peripheral wall portion extending from a peripheral edge of the bottom wall portion, and a protruding opening through which the airbag inflating by an inflation gas protrudes. The airbag cover includes a door portion arranged to cover the protruding opening and adapted to be pushed and opened by the inflating airbag upon deployment and inflation of the airbag, and four side wall portions protruding from peripheral edges of the door portion and arranged near to the peripheral wall portion of the case. The peripheral wall portion of the case includes two locking wall portions which is opposing to each other and to which the side wall portions of the airbag cover is attached, and two connection wall portions connecting the two locking wall portions to each other. Each of the locking wall portions has a locking claw in a vicinity of an edge of the locking wall near to the protruding opening, the locking claw protruding outward and bent so that a distal end of the locking claw directs toward the bottom wall portion. As attaching wall portions, a first pair of the four side wall portions opposing to each other to be located near to the locking wall portions are arranged on outer peripheral sides of the locking wall portions, the first pair of the four side wall portions have a locking hole, a peripheral edge of the locking hole is locked by the locking claw, and the first pair of the four side walls are attached to the locking wall portions by locking the locking claw on the peripheral edge of the locking hole. As cover wall portions, a second pair of the four side wall portions opposing to each other are arranged near to inner peripheral sides of the connection wall portions to cover an inner peripheral side of the peripheral wall portion located at vicinities of corner portions of a peripheral edge of the protruding opening.

According to the airbag apparatus, the two cover wall portions of the four side wall portions of the airbag cover, which are arranged to oppose to each other in one direction, are arranged on the inner peripheral sides of the connection wall portions and also near to the connection wall portions to cover the inner peripheral side of the peripheral wall portion of the case located at the vicinities of corner portions of the peripheral edge of the protruding opening upon deployment and inflation of the airbag. Therefore, the inflating airbag can be inhibited from coming in contact with parts on the peripheral edge of the protruding opening of the case located at the vicinities of the corner portions. Also, according to the airbag apparatus, the attaching wall portions of the four side wall portions of the airbag cover, which are arranged to oppose to each other in another direction, are attached to the case using the locking claws formed on the locking wall portions of the case. Accordingly, the airbag cover can be easily mounted on the case.

Therefore, according to the airbag apparatus, the inflating airbag can be inhibited from coming in contact with the vicinities of the corner portions of the peripheral edge of the protruding opening of the case, and also the airbag cover can be easily mounted on the case.

In the airbag apparatus, the attaching portions for attaching the case to a body of a vehicle may be arranged on connection wall portions of the peripheral wall portion. According to this configuration, the cover wall portions of the airbag cover do not cover outer peripheral sides of the connection wall portions, but cover inner peripheral sides of the connection wall portions. Accordingly, even if the attaching portions are arranged on the peripheral edge of the protruding opening of the case, the connection wall portions can be widely covered with the cover wall portions without any problems. Therefore, the periphery (inner peripheral side or outer peripheral side) of the peripheral wall portion of the case can be widely covered with four side wall portions (attaching wall portions and cover wall portions) of the airbag cover. As a result, when the door portion is opened upon deployment and inflation of the airbag, a gap can be inhibited from being occurred between the airbag cover and the case in an area extending form the peripheral wall portion of the case to the door portion and thus the airbag can be smoothly protruded through the protruding opening. By the way, in a configuration in which the cover wall portions cover the outer peripheral sides of the connection wall portions, if the attaching portions are arranged on the peripheral edge of the protruding opening in the connection wall portions, distal ends of the cover wall portions will be recessed not to be interfered with the attaching portions, thereby occurring a gap between the peripheral wall portion of the case and the cover wall portions.

In the airbag apparatus, the attaching wall portions of the airbag cover may have a width dimension in a direction along an opening plane of the protruding opening set to be larger than that of the cover wall portions. According to this configuration, the airbag cover can be mounted on the case over a wide range along the opening plane of the protruding opening, thereby allowing the airbag cover to be stably mounted on the case.

In the airbag apparatus, the cover wall portions may be arranged to oppose to each other in a left-right direction of a vehicle when the airbag apparatus is mounted in the vehicle. According to this configuration, the attaching portions formed on the peripheral wall portion of the case are arranged to extend outward in the left-right direction. In other words, the attaching portions need not be arranged to extend from the locking wall portions of the case outward in an opposing direction of the locking wall portions. Therefore, even if a space of an area between the locking wall portions, i.e., a width dimension thereof in the opposing direction of the locking wall portions is not reduced, the case when being mounted in the vehicle can be hardly interfered with peripheral components arranged in the opposing direction of the locking wall portions of the case, thereby providing a good workability in mounting the airbag apparatus to the vehicle.

In the airbag apparatus, the attaching wall portions and the cover wall portions may be connected to each other along a circumferential direction of the peripheral wall portion to define a tubular shape, and also recesses are provided to allow parts of the peripheral wall portion, which are located at the vicinities of the corner portions of the peripheral edge section of the protruding opening, to be inserted therein. According to this configuration, end surfaces at the vicinities of the corner portions of the peripheral edge section of the protruding opening can be covered with parts on inner peripheral surface sides of the recesses arranged near thereto, and therefore, the inflating airbag can be further prevented from coming in contact with the vicinities of the corner portions of the peripheral edge of the protruding opening of the case.

DETAILED DESCRIPTION

Figure 1:
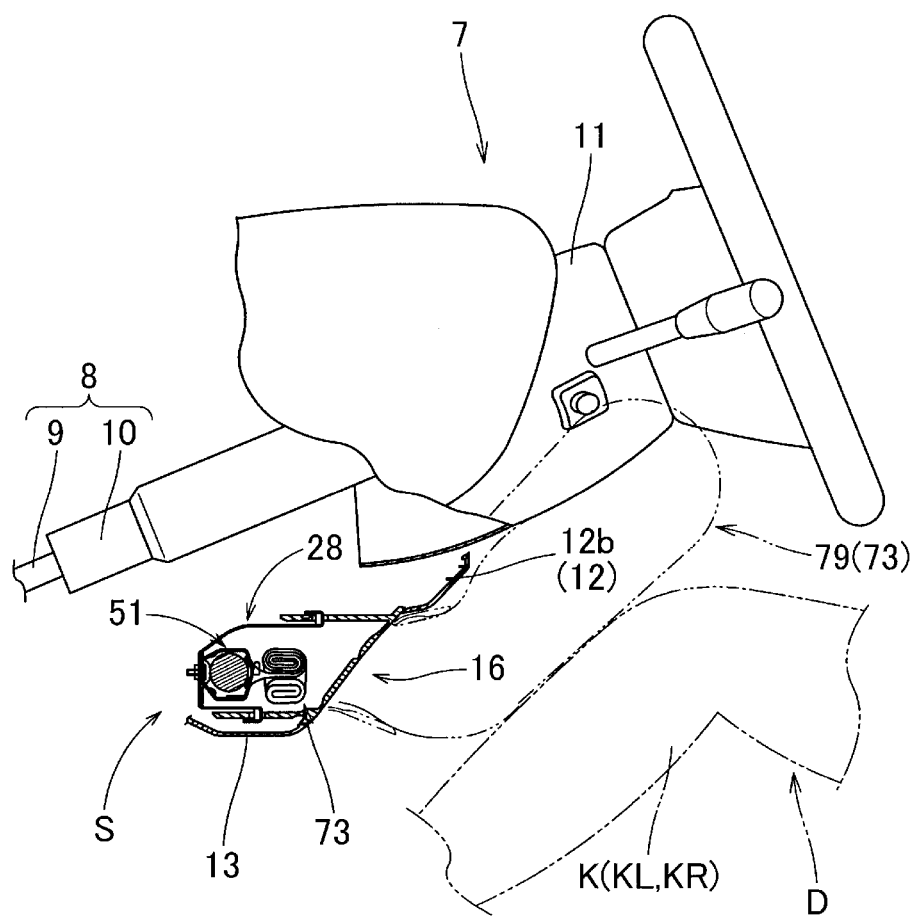
FIG. 1 is a schematic longitudinal sectional view showing a usage state of a knee protection airbag apparatus according to one embodiment, as taken along a front-rear direction of a vehicle.
Figure 5:
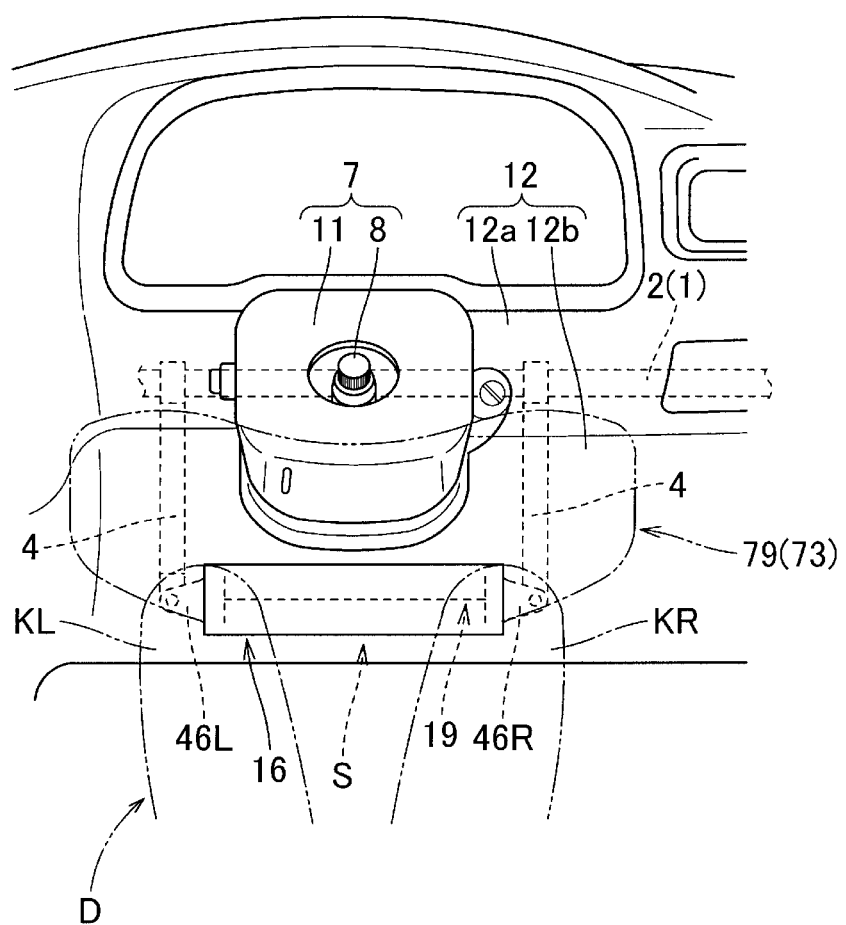
FIG. 5 is a schematic front view showing a usage state of the knee protection airbag apparatus according to the embodiment, as viewed from a rear side of the vehicle.

One embodiment of the present invention will be now described with reference to the accompanying drawings. In the embodiment, a knee protection airbag apparatus S will be described by way of example. As shown in FIGS. 1 and 5, the knee protection airbag apparatus (hereinafter, simply referred to as an 'airbag apparatus') S according to the embodiment is arranged below a steering column 7, which is located on a vehicle front side of a driver D as a passenger, to protect knees K (KL and KR) of the driver D. Meanwhile, unless otherwise specified, upward-downward, left-right and front-rear directions as used herein correspond respectively to upward-downward, left-right and front-rear directions of a vehicle when the airbag apparatus S has been mounted in the vehicle.

The steering column 7, as shown in FIGS. 1 and 5, has a column body 8 and a column cover 11 covering an outer periphery of the column body 8. As shown in FIGS. 1 and 5, the column body 8 is constituted of a main shaft 9 and a column tube 10 covering a periphery of the main shaft 9.

Figure 2:
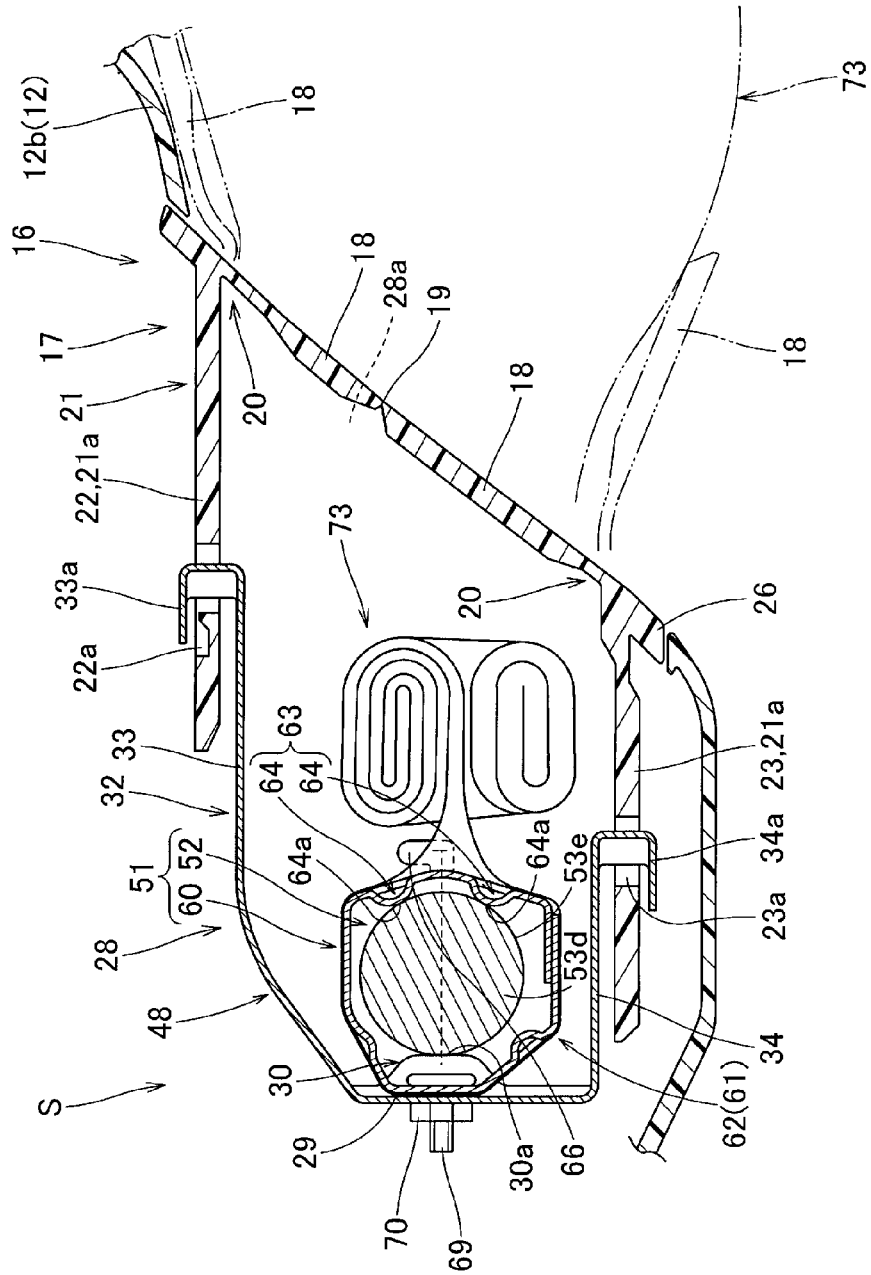
FIG. 2 is an enlarged schematic longitudinal sectional view of the knee protection airbag apparatus according to the embodiment, as taken along the front-rear direction of the vehicle.
Figure 3:
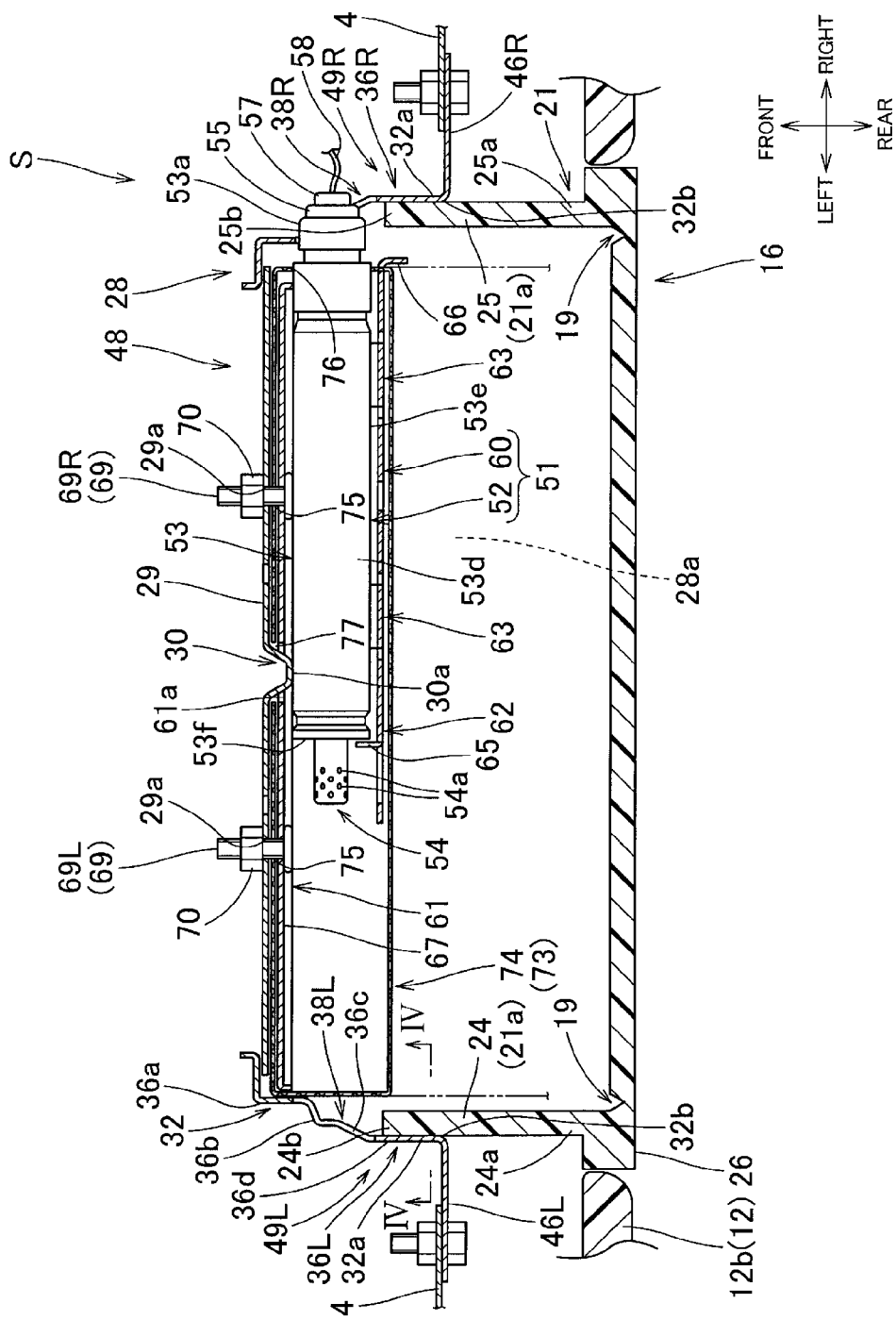
FIG. 3 is a schematic cross sectional view of the knee protection airbag apparatus according to the embodiment, as taken along a left-right direction of the vehicle.

As shown in FIGS. 2 and 3, the airbag apparatus S includes a folded airbag 73, an inflator 51 for supplying an inflation gas to the airbag 73, a case 28 adapted to receive the folded airbag 73 and the inflator 51 therein and opened on a vehicle rear side thereof, and an airbag cover 16 adapted to cover a vehicle rear side of the folded airbag 73.

The airbag cover 16, which is formed of polyolefin-based thermoplastic elastomer, is configured to cover a vehicle rear side of the case 28. As shown in FIGS. 1 to 3 and 5, the airbag cover 16 is arranged on a lower panel 12b side of an instrument panel 12 constituted of an upper panel 12a and the lower panel 12b. In the embodiment, the airbag cover 16 has a door installation portion 17 arranged near to a protruding opening 28a of the case 28 and a peripheral edge potion 26 extending around the door installation portion 17.

The door installation portion 17 has a door portion 18 covering the protruding opening 28a of the case 28 and a peripheral wall portion 21 extending forward from an outer peripheral edge of the door portion 18. The door portion 18 is of a generally rectangular plate shape covering a vehicle rear side of the protruding opening 28a of the case 28. In the embodiment, the door portion 18 has, on a periphery thereof, a thin breakable portion 19 arranged to have a generally H shape as viewed from the vehicle rear side, and hinge portions 20 arranged on both ends thereof in the upward-downward direction to serve as pivot centers upon opening, and thus is configured to be opened toward both sides in the upward-downward direction upon opening.

As shown in FIGS. 2, 3, 6 and 9, the peripheral wall portion 21 is arranged to extend forward from the peripheral edge of the door portion 18 and is configured so that parts (rear end side) thereof near to the door portion 18, which correspond to a base portion side thereof, are connected to each other along a circumferential direction of a peripheral wall portion 32 of the case 28 to define a generally tubular shape and parts on a distal end side thereof are separated from each other at regions of corner portions thereof to define four flat plates. Namely, the peripheral wall portion 21 is formed to protrude from the peripheral edge of the door portion 18 and has four side wall portions 21a arranged near to the peripheral wall portion 32 of the case 28. In the peripheral wall portion 21, two side wall portions 21a and 21a, which are arranged to oppose each other in the upward-downward direction, form attaching wall portions 22 and 23 adapted to be respectively attached to an upper wall portion 33 and a lower wall portion 34 as locking wall portions of the case 28 as described below, and two side wall portions 21a and 21a, which are arranged to oppose each other in the left-right direction, forms cover wall portions 24 and 25 adapted to cover an inner peripheral side of the peripheral wall portion 32 of the case 28 (see FIGS. 2 and 3). In the embodiment, the case 28 is of a generally box shape having a width dimension in the left-right direction set to be larger as described below, and the attaching wall portions 22 and 23 arranged to oppose each other in the upward-downward direction, as shown in FIGS. 2 and 3, have a width dimension in a direction along an opening plane of the protruding opening 28a set to be larger than that of the cover wall portions 24 and 25 arranged to oppose each other in the left-right direction, corresponding to the peripheral wall portion 32 of the case 28.

Figure 4:
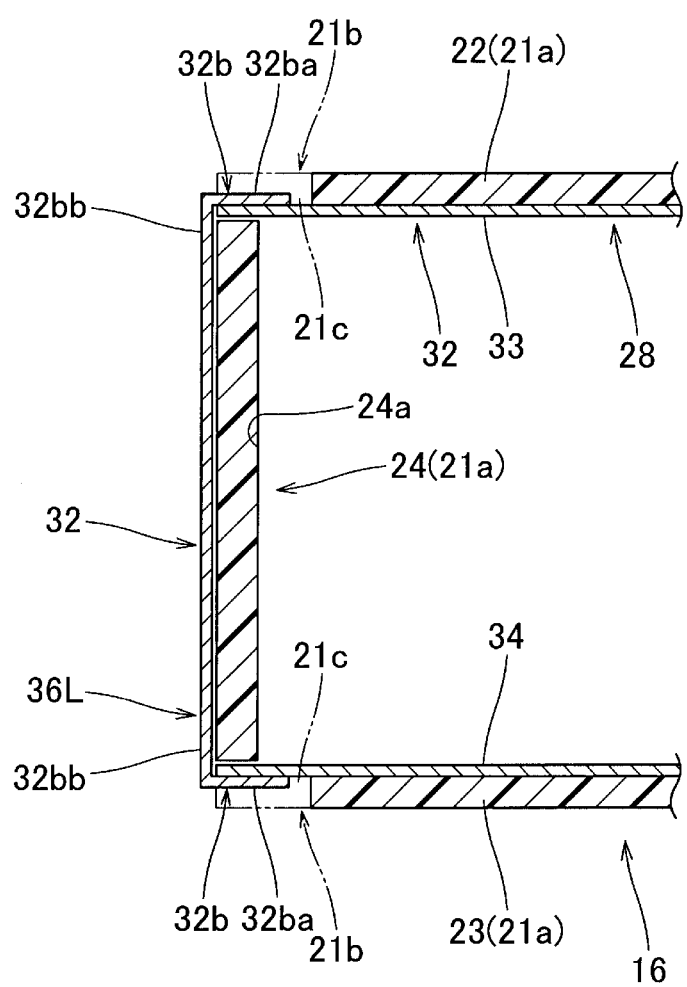
FIG. 4 is a partially enlarged sectional view taken along a line IV-IV in FIG. 3.

As shown in FIG. 2, the attaching wall portions 22 and 23 are respectively arranged to adjoin outer peripheries of the upper wall portion 33 and lower wall portion 34 as locking wall portions of the peripheral wall portion 32 of the case 28, and respectively have locking holes 22a and 23a arranged at five locations thereon along the left-right direction corresponding to locking claws 33a and 34a, which are respectively formed on the upper wall portion 33 and the lower wall portion 34, and opened in a generally rectangular shape to allow the locking claws 33a and 34a to be locked therein. As shown in FIGS. 3 and 4, the cover wall portions 24 and 25 are respectively arranged to adjoin inner peripheries of a left wall portion 36L and a right wall portion 36R as connection wall portions of the peripheral wall portion 32 of the case 28. As shown in FIGS. 3, 4, 8 and 9, the cover wall portions 24 and 25 are respectively configured to cover the inner peripheral side of the peripheral wall portion 32 of the case 28 located at the vicinities of corner portions 32b of a peripheral edge section 32a of the protruding opening 28a. Specifically, in the embodiment, the cover wall portions 24 and 25 are respectively configured so that a width dimension of base portion-side sections 24a and 25a thereof in the upward-downward direction are set to be slightly smaller than a spacing distance between the upper wall portion 33 and the lower wall portion 34 of the case 28 and thus as shown in FIG. 4, the base portion-side sections 24a and 25a cover inner peripheral sides of the left wall portion 36L and the right wall portion 36R over the substantially entire region thereof in the upward-downward direction. Also, parts of the base portion-side sections 24a and 25a and the cover wall portions 24 and 25 near to end edges thereof in the upward-downward direction are arranged to cover the inner peripheral side at the vicinities of the corner portions 32b. Further, in the embodiment, the cover wall portions 24 and 25 are respectively configured so that a width dimension thereof in the upward-downward direction is decreased toward distal ends 24b and 25b thereof spaced from the protruding opening 28a (see FIG. 8), and also the distal ends 24b and 25b are respectively located near to a boundary between a distal end portion 36d and an inclined portion 36c in each of the left wall portion 36L and the right wall portion 36R (see FIG. 3).

Figure 6:
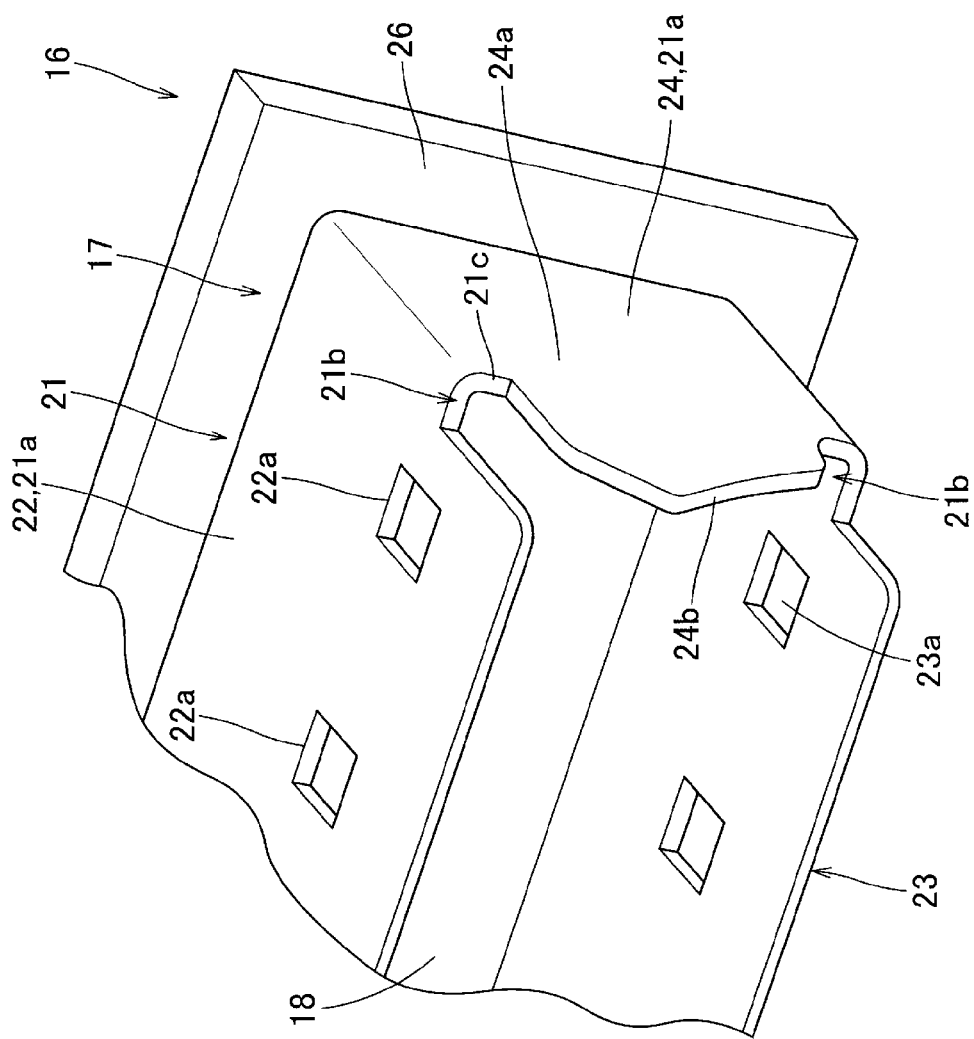
FIG. 6 is a partially enlarged schematic perspective view showing an airbag cover used in the knee protection airbag apparatus according to the embodiment, as viewed from a front side of the vehicle.
Figure 8:
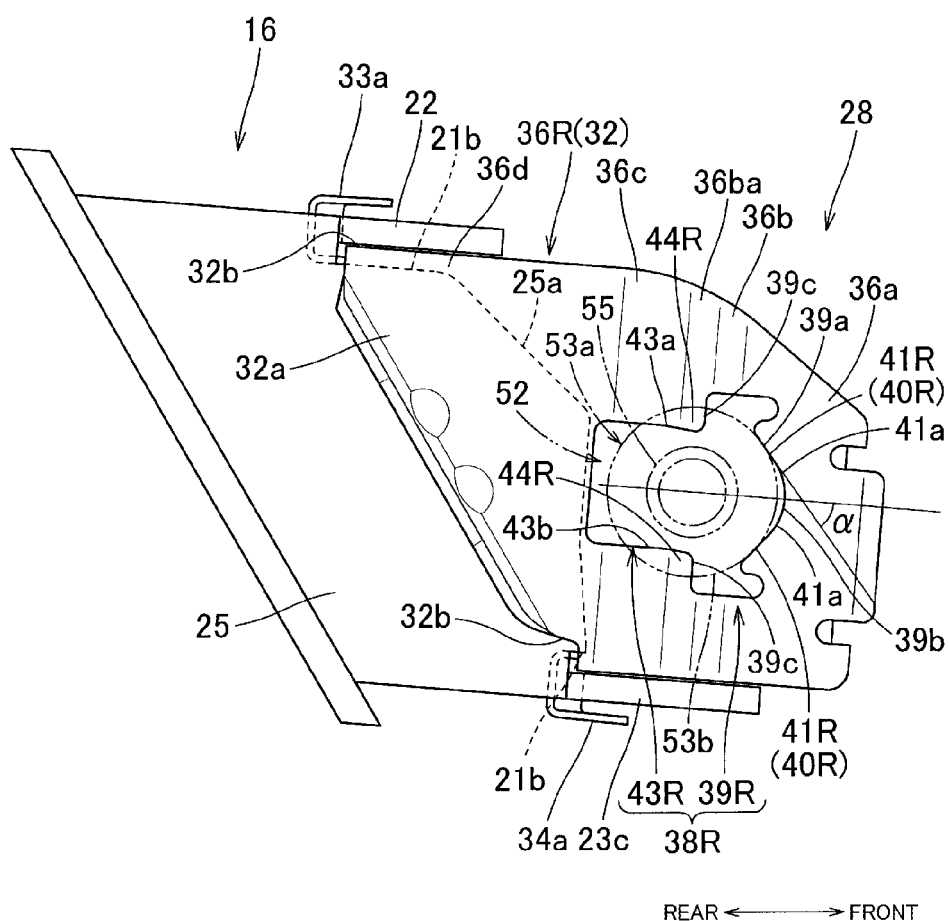
FIG. 8 is a right side view showing a state where the airbag cover is mounted on the case.
Figure 9:
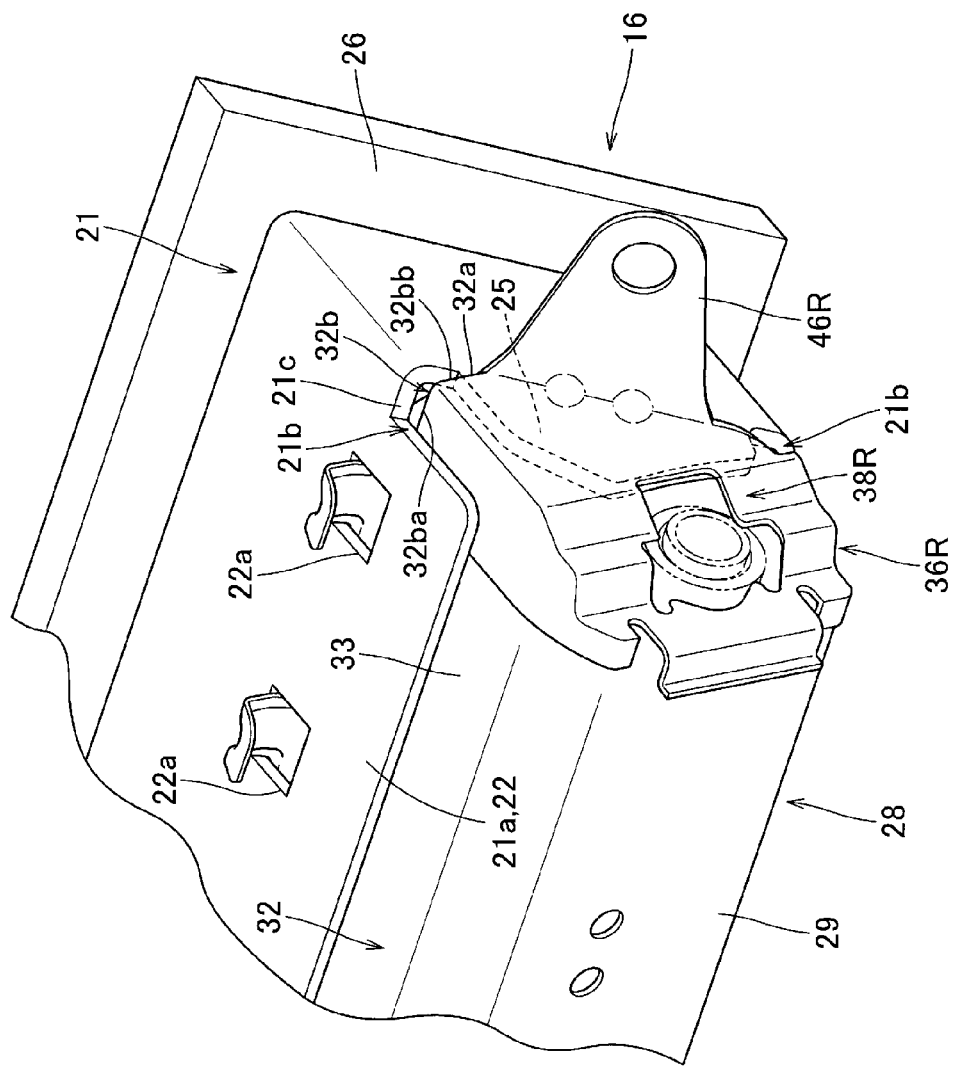
FIG. 9 is a partially enlarged schematic perspective view showing a state where the airbag cover is mounted on the case.

Also, as described above, the peripheral wall portion 21 is arranged to extend forward from the peripheral edge of the door portion 18, and as shown in FIGS. 6 and 9, is configured so that the parts (rear end side) thereof near to the door portion 18, which correspond to the base portion side thereof are connected to each other along the circumferential direction of the peripheral wall portion 32 of the case 28 to define a generally tubular shape and the parts on the distal end side thereof define the attaching wall portions 22 and 23 and the cover wall portions 24 and 25. Namely, the peripheral wall portion 21 has slit-shaped notches between the attaching wall portions 22 and 23 and the cover wall portions 24 and 25 to allow parts of the peripheral wall portion 32 of the case 28, which are located at the vicinities of the corner portions, to be inserted therein, and in parts near to the door portion 18, recesses 21b are arranged to be continued from the notches and to allow the parts of the peripheral wall portion 32 of the case 28, which are located at the vicinities of the corner portions 32b of the peripheral edge section 32a of the protruding opening 28a, to be inserted therein (see FIGS. 8 and 9). The peripheral edge portion 26, which is arranged over the entire circumference of the peripheral edge of the door installation portion 17, is formed to have a rear surface generally flushed with the door portion 18 and also to extend outward from the door portion 18 (see FIGS. 2, 3 and 6).

Figure 7:
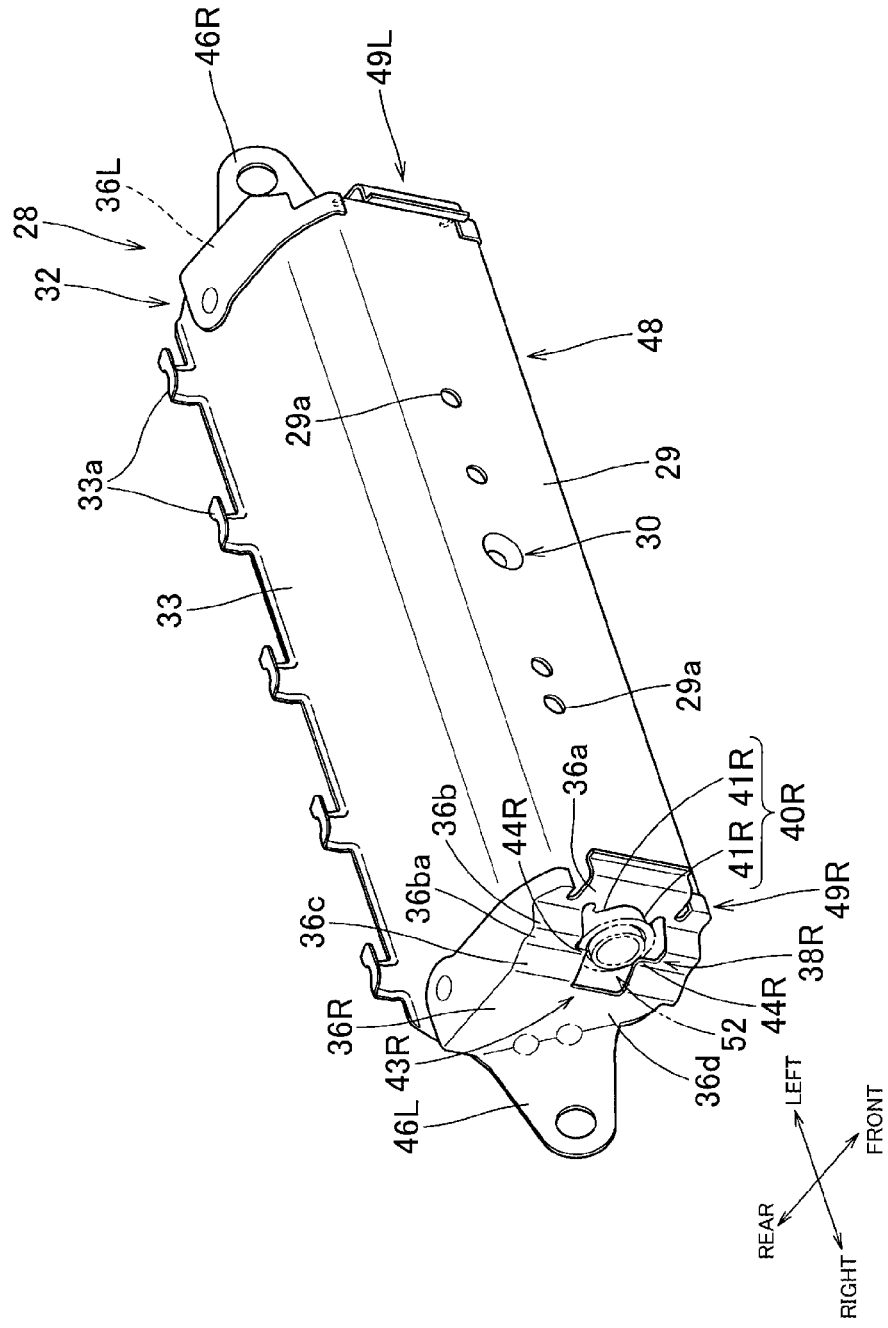
FIG. 7 is a schematic perspective view showing a case used in the knee protection airbag apparatus according to the embodiment, as viewed from the front side of the vehicle.

The case 28 is made of sheet metal and in the embodiment, as shown in FIGS. 7 to 10, has a generally rectangular-shaped bottom wall portion 29 arranged on a vehicle front side thereof and a generally rectangular tubular peripheral wall portion 32 extending from a peripheral edge of the bottom wall portion 29 rearward along the front-rear direction. Thus, the case 28 is of a generally box shape having the protruding opening 28a defined on a rear end side of the peripheral wall portion 32 to allow the airbag 73 to protrude therethrough. In the embodiment, the case 28 is of a flat box shape having a width dimension in the left-right direction set to be larger. Also, in the embodiment, the case 28, as shown in FIG. 7, is configured so that two side members 49L and 49R, by which the left side wall portion 36L and the right side wall portion 36R of the peripheral wall portion 32 are respectively formed, and a main body member 48, by which the upper wall portion 33 and the lower wall portion 34 of the peripheral wall portion 32 and the bottom wall portion 29 are formed, are fused with each other at predetermined locations thereon. In the embodiment, the side members 49L and 49R are bilaterally symmetric.

More specifically, the bottom wall portion 29 is of a generally rectangular plate shape having a wide width in the left-right direction and has insertion holes 29a and 29a provided at two locations thereon along the left-right direction to allow bolts 69 (69L and 69R), as described below, provided on a retainer 60 to be inserted therethrough. Also, at a location on the bottom wall portion 29, which corresponds to substantially the middle between the insertion holes 29a and 29a, a support protrusion 30 is formed to protrude toward an inside of the case 28 (toward the inflator 51) generally along a protruding direction of the bolts 69. The support protrusion 30, which is of a generally truncated cone shape, is configured so that when being mounted in a vehicle, a generally flat surface-shaped distal end 30a thereof is abutted against an outer peripheral surface 53e of a middle section 53d of a main body portion 53, as described below, of an inflator body 52, thereby supporting the inflator body 52 (see FIGS. 2 and 3). The support protrusion 30 is formed at a location on the bottom wall portion 29, which corresponds to substantially the middle thereof in the left-right direction.

The peripheral wall portion 32 has the upper wall portion 33 and the lower wall portion 34 as two locking wall portions, which are arranged to oppose each other in the upward-downward direction, and the left wall portion 36L and the right wall portion 36R as two connection wall portions, which are arranged to oppose each other in the left-right direction and thus to connect between the upper wall portion 33 and the lower wall portion 34. The upper wall portion 33 and the lower wall portion 34 as locking wall portions are parts intended to allow the attaching wall portions 22 and 23 of the airbag cover 16 to be attached thereto, and in the vicinities of rear ends thereof, which correspond to the vicinities of edge portions thereof near to the protruding opening 28a, the locking claws 33a and 34a are formed to allow peripheral edges of the locking holes 22a and 23a formed in the attaching wall portions 22 and 23 to be respectively locked thereon. Each of the locking claws 33a and 34a is configured to protrude outward in the upward-downward direction and also to be bent so that a distal end thereof is oriented toward the bottom wall portion 29 (toward the vehicle front side), and in the embodiment, is formed at five locations on each of the upper wall portion 33 and the lower wall portion 34 along the left-right direction.

In the embodiment, the left wall portion 36L and the right wall portion 36R as connection wall portions are configured to be bilaterally symmetric. In the embodiment, the right wall portion 36R arranged near to a connector 57 of the inflator body 52 will be described in detail by way of example.

Figure 10:
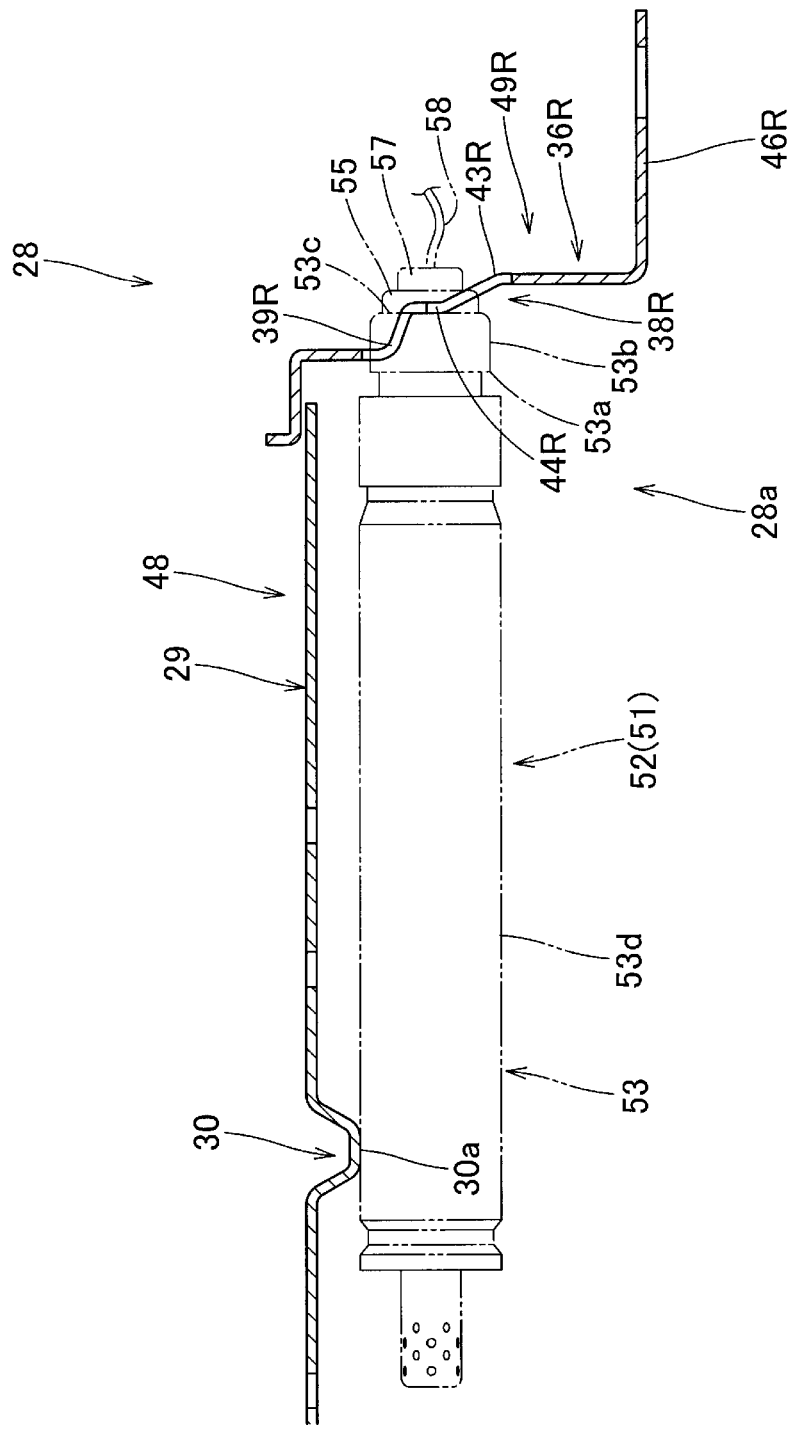
FIG. 10 is a partially enlarged cross sectional view of the case of FIG. 7.

The right wall portion 36R is configured to be stepped in such a manner that a side (front end side) thereof near to the bottom wall portion 29 is located inward (on the left side) in the left-right direction and a side (rear end side) thereof near to the protruding opening 28a is located outward (on the right side) in the left-right direction. Specifically, the right wall portion 36R, as shown in FIG. 10, is configured to be stepped in a cross section thereof taken along a horizontal direction, in such a manner that between a front base portion 36a and a rear distal end portion 36d thereof generally arranged along the front-rear direction, a stepped portion 36b formed to be bent and an inclined portion 36c connected to the stepped portion 36b and inclined toward the distal end portion 36d are arranged. The stepped portion 36b is formed in a stepped shape to be connected to the base portion 36a and also to orient a rear section 36ba thereof outward in the left-right direction, and the inclined portion 36c is inclinedly formed so that an front end side thereof connected to the rear section 36ba of the stepped portion 36b is oriented inward in the left-right direction and a rear end side thereof connected to the distal end portion 36d is oriented outward in the left-right direction.

The right wall portion 36R has a connector opening 38R formed to expose a connection port portion 55 and thus to allow the connector 57 to be connected to the connection port portion 55 in a state where the inflator 51 has been attached to the case 28. As shown in FIGS. 8 to 10, the connector opening 38R is formed to extend from the base portion 36a to the distal end portion 36d and thus to extend across the stepped portion 36b, and in particular, has a main opening 39R formed in a region extending from the base portion 36a to a middle section of the stepped portion 36, and an auxiliary opening 43R formed in a region extending from a rear end side of the stepped portion 36b to the distal end portion 36d.

As shown in FIG. 8, the main opening 39R is configured, as viewed from the right side, to have a wide width in the upward-downward direction and also to have a front edge 39a curved to be widened toward a rear side thereof (a side near to the protruding opening 28a). The main opening 39R allows only the connection port portion 55 of the inflator body 52 to be inserted therethrough and thus is sized not to allow the inflator body 52 itself (main body portion 53) to be inserted therethrough. Specifically, the main opening 39R has an opening width dimension in the upward-downward direction set to be larger than an outer diameter dimension of a right end section 53a of the inflator body 52, so that an approximately half region of the right end section 53a can be exposed (see a two-dot chain line in FIG. 8). Also, on a side of the main opening 39R near to the curved front edge 39a, a guide portion 40R is arranged to guide the inflator body 52 to a location, where falling-out thereof is prevented by protruding pieces 44R, as described below, when the inflator 51 is attached to the case 28. The guide portion 40R is formed on the front edge 39a of the main opening 39R and has two guide surfaces 41R opposing each other in the upward-downward direction, which is a direction perpendicular to an axial direction of the inflator body 52, and having a spacing distance therebetween decreased toward the bottom wall portion 29. In other words, the guide surfaces 41R are formed so that the spacing distance is deceased toward a moving direction of the inflator body 52 when fastening a nut 70 to the bolt 69, and in the embodiment, are arranged to be generally symmetrically inclined in the upward-downward direction. Also, the guide surfaces 41R are configured so that when fastening the nut 70 to the bolt 69, the guide surfaces 41R are slid along a part of an outer peripheral surface 53b of the right end section 53a of the inflator body 52, which corresponds to the connection port portion 55 side thereof, while being kept abutted against the outer peripheral surface 53b of the right end section 53a of the inflator body 52, which corresponds to the connection port portion 55 side thereof. Specifically, the guide surfaces 41R are configured so that an inclined angle α thereof to an axial direction of the bolt 69 (direction perpendicular to the bottom wall portion 29) is set to approximately 50° (see FIG. 8) and distal ends 41a and 41a thereof near to the bottom wall portion 29 are smoothly connected to each other by a curved section 39b curved in a generally circular arc shape.

Figure 13A:
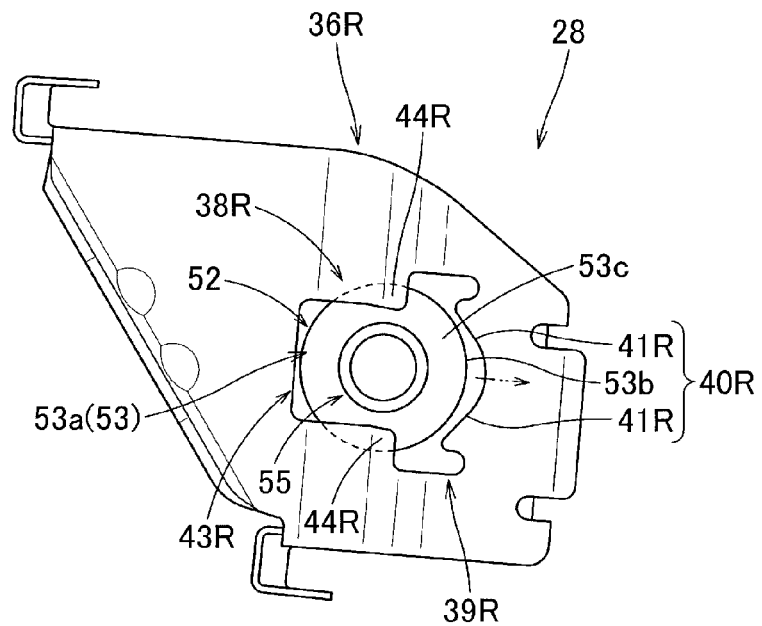
FIG. 13A is a schematic right side view explaining a state where an inflator body is received in the case in the knee protection airbag apparatus according to the embodiment.
Figure 13B:
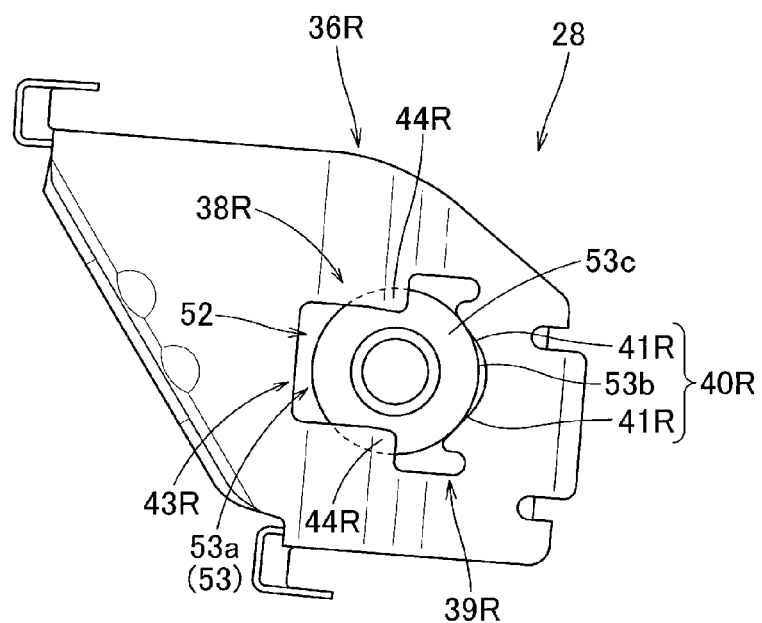
FIG. 13B is a schematic right side view explaining a state where the inflator body is received in the case in the knee protection airbag apparatus according to the embodiment.

Also, the guide portion 40R has a spacing distance thereof from the auxiliary opening 43R dimensioned in such a manner that in a state where the outer peripheral surface 53b of the right end section 53a of the inflator body 52, which corresponds to the connection port portion 55 side thereof, is supported by the guide surfaces 41R (a state where the inflator 51 has been attached to the case 28), as shown in FIG. 13B, the protruding pieces 44R and 44R can press a right end surface 53c on a peripheral edge of the connection port portion 55 of the inflator body 52. In addition, the main opening 39R is configured so that a rear edge 39c thereof connected to the auxiliary opening 43R is of a straight line shape generally perpendicular to an upper edge 43a and a lower edge 43b of the auxiliary opening 43R.

The auxiliary opening 43R is of a generally rectangular shape dimensioned to have an opening width dimension in the upward-downward direction set to be smaller than that of the main opening 39R, and is formed to be communicated with the main opening 39R and to extend rearward (toward the protruding opening 28a). The auxiliary opening 43R is likewise dimensioned to have the opening width dimension allowing the connection port portion 55 of the inflator body 52 to be inserted therethrough.

Also, in the embodiment, parts of a peripheral edge of the connector opening 38R, which are located in the vicinity of a boundary between the auxiliary opening 43R and the main opening 39R, form the protruding pieces 44R for preventing falling-out of the inflator 51. The protruding pieces 44R, which are formed at two locations opposing each other in a direction (upward-downward direction) perpendicular to an axial direction of the bolt 69 formed on the retainer 60, are formed in a rear end region (rear section 36ba) of the stepped portion 36b in the right wall portion 36R. Namely, the protruding pieces 44R are arranged more outward along an axial direction (outward in the left-right direction) of the inflator 51 (inflator body 52) than the guide portion 40R arranged in a region of the base portion 36a of the right wall portion 36R, and when the nut 70 is fastened to the bolt 69 to attach the inflator 51 to the case 28, parts thereof near to the outer peripheral surface 53b of the right end section 53a can press the right end surface 53c on the peripheral edge of the connection port portion 55 of the inflator body 52 supported by the guide portion 40R (see FIGS. 10, 13A and 13B).

Also, in the case 28 according to the embodiment, attaching piece portions (attaching portions) 46L and 46R are respectively formed to extend from rear edges of the left wall portion 36L and the right wall portion 36R of the peripheral wall portion 32, which are arranged on outer peripheral sides of the cover wall portions 24 and 25, outward in the left-right direction (see FIG. 3). Namely, in the embodiment, each of the attaching portions 46L and 46R is provided on the peripheral edge of the protruding opening 28a of the case 28. The attaching piece portions 46L and 46R are arranged in front of the peripheral edge portion 26 of the airbag cover 16 when being mounted in the vehicle, and as shown in FIG. 5, are configured to be connected to brackets 4 extending from an instrument panel reinforcement 2 on the body 1. In the embodiment, the attaching piece portions 46L and 46R are integrally formed with the left wall portion 36L and the right wall portion 36R, and thus together with the left wall portion 36L and the right wall portion 36R, are formed by the side members 49L and 49R. Meanwhile, although not shown in detail, in the case 28 according to the embodiment, the left wall portion 36L (side member 49L) has likewise a connector opening 38L formed therein as shown in FIG. 3, and the connector opening 38L has the same configurations as those of the connector opening 38R formed in the right wall portion 36R.

As shown in FIG. 3, the inflator 51 has the inflator body 52 having a generally circular columnar outer shape, and the retainer 60 for retaining the inflator body 52.

The inflator body 52 is of a generally circular columnar shape, of which an axial direction is arranged to extend along the left-right direction, and has the large diameter main body portion 53 and a small diameter gas discharging portion 54 formed to protrude from one end of the main body portion 53 in the left-right direction. The gas discharging portion 54 has a plurality of gas discharging ports 54a formed to discharge an inflation gas. In the embodiment, the gas discharging portion 54 is arranged on a left end side of the main body portion 53. On a right end side of the main body portion 53, the connection port portion 55 is formed to connect the connector 57, to which a lead wire 58 for inputting an operation signal is connected (see FIGS. 13A and 13B). In the inflator main body 53 according to the embodiment, the right end section 53a of the main body portion 53, which corresponds to the connection port portion 55 side thereof, has a diameter slightly smaller than that of the middle section 53d. Also, in the inflator main body 53 according to the embodiment, the connection port portion 55 has a diameter smaller than that of the right end section 53a of the main body portion 53 and is formed to protrude from the right end surface 53c of the main body portion 53 toward the right side (see FIGS. 3, 10, 13A and 13B).

Figure 11:
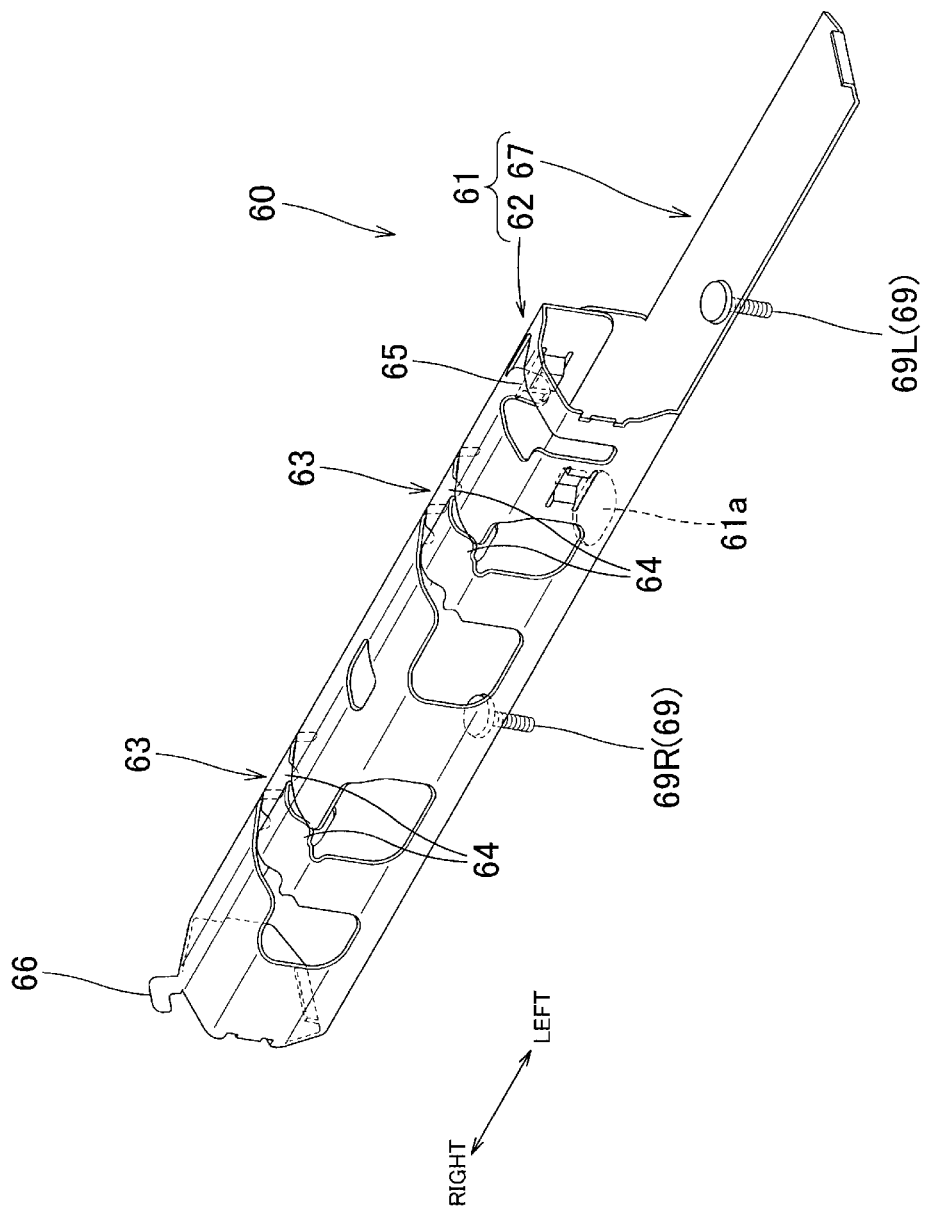
FIG. 11 is a perspective view showing a retainer used in the knee protection airbag apparatus according to the embodiment.

As shown in FIGS. 3 and 11, the retainer 60 has a retaining portion 61 for retaining the inflator main body 53 and two bolts 69L and 69R formed to protrude generally perpendicularly to an axial direction of the retaining portion 61. The bolts 69L and 69R are arranged to protrude from the bottom wall portion 29 of the case 28 toward the vehicle front side when being mounted in the vehicle.

As shown in FIG. 11, the retaining portion 61, which is made of sheet metal, has a tubular portion 62 for retaining the inflator body 52 and a plate-shaped portion 67 extending from a left end of the tubular portion 62 toward the left side. The plate-shaped portion 67 is of a flat plate shape extending generally along the bottom wall portion 29 of the case 28, and the left bolt 69L is arranged to protrude from the plate-shaped portion 67. In a part of the retaining portion 61, which is located between the bolt 69L and the bolt 69R and also in front of the inflator body 52 when being mounted in the vehicle, a through-hole 61a is formed to allow the support protrusion 30 formed on the bottom wall portion 29 of the case 28 to be inserted therethrough. Also, on a part of the tubular portion 62, which is arranged in the rear of the main body portion 53 of the inflator body 52 when being mounted in the vehicle, abutting portions 63 are formed to be abutted against the outer peripheral surface 53e of the middle section 53d of the main body portion 53 when being mounted in the vehicle. As shown in FIG. 3, the abutting portions 63 are formed at two locations, which respectively correspond to the left and right sides of the right bolt 69R, so that the right bolt 69R is positioned therebetween. As shown in FIG. 2, each abutting portion 63 has two protrusions 64 and 64 aligned generally along the upward-downward direction in a front half region thereof as viewed in a cross section take along the front-rear direction. Each protrusion 64 is formed so that the tubular portion 62 is partially recessed toward the inflator body 52, in other words, protruded toward the inflator body 52. Also, each protrusion 64, which is of a generally semicircular arc-shaped outer shape, is configured so that a distal end surface 64a thereof is abutted against the outer peripheral surface 53e of the middle section 53d of the main body portion 53 of the inflator body 52.

Also, in the vicinity of a left end of the tubular portion 62, a protruding piece 65 for positioning the inflator body 52 when the inflator body 52 has been inserted therein is formed to protrude from an inner periphery thereof. As shown in FIG. 3, the protruding piece 65 is abutted against an end surface (left end surface 53*f*) of the gas discharging portion 54 in the main body portion 53 of the inflator body 52 to limit a movement of the main body portion 53 toward the left side, thereby positioning the gas discharging portion 54 inside the retainer 60. In addition, the tubular portion 62 has, on a right end side thereof, a locking claw portion 66 formed to protrude from an opening slit 76 for inserting the inflator, as described below, when the retainer 60 has been received in the airbag 73 through the opening slit 76 and then the airbag 73 has been folded (see FIGS. 2 and 3). The locking claw portion 66 is formed in a generally L shape to protrude rearward from a rear edge when being mounted in the vehicle and then to be bent upward at a distal end side thereof. The airbag apparatus S according to the embodiment is configured so that upon assembling, the airbag 73 is folded with the retainer 60 received therein and then the inflator body 52 is inserted into the airbag 73 through the opening slit 76 to be inserted into the retaining portion 61 (tubular portion 62) of the retainer 60, and accordingly, the locking claw portion 66 is provided to prevent the retaining portion 61 of the retainer 60 received in the airbag 73 from being dislocated relative to the opening slit 76.

Also, the airbag apparatus S according to the embodiment is configured so that when the inflator body 52 has been received in the retaining portion 61 of the retainer 60 arranged in the airbag 73 and then the airbag 73 has been received in the case 28, the inflator 51 and the airbag 73 are attached to the case 28 by protruding the bolts 69 of the retainer 60 from the bottom wall portion 29 of the case 28 and then fastening the nuts 70 to the bolts 69. Specifically, upon fastening of the nuts 70, the inflator body 52 is sandwiched by the support protrusion 30 formed on the bottom wall portion 29 of the case 28, the guide portion 40R formed on the front edge side of the connector opening 38R of the right wall portion 36R of the case 28, and the abutting portions 63 and 63 formed in the retaining portion 61 of the retainer 60, and thus is retained by the retainer 60.

In the embodiment, the airbag 73 is formed of a woven fabric made of flexible polyester or polyamide yarns or the like. Also, the airbag 73 has a generally rectangular plate shape, as shown by a two-dot chain line in FIGS. 1 and 5, upon completion of inflation and is configured to protect left and right knees K (KL and KR) of a driver D. In the embodiment, the airbag 73, as shown in FIG. 12, has an attaching portion 74 arranged in the case 28 upon completion of inflation and a protective inflation portion 79 having a width in the left-right direction wider than that of the attaching portion 74 and adapted to protect knees K (KL and KR) of the driver D upon completion of inflation.

Figure 12:
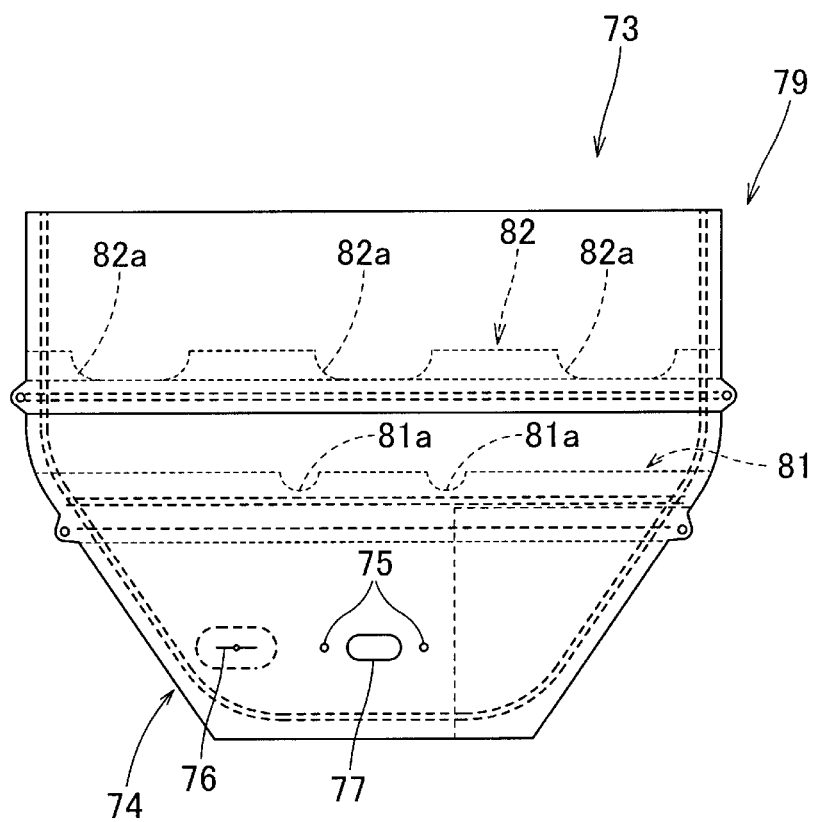
FIG. 12 is a rear view showing an airbag used in the knee protection airbag apparatus according to the embodiment.

As shown in FIG. 12, the attaching portion 74 has two insertion holes 75 and 75, the opening slit 76 and a through-hole 77 formed therein. The insertion holes 75 and 75 are respectively intended to allow the bolts 69 of the retainer 60 to be inserted therethrough. The opening slit 76 is intended to allow the retainer 60 and the inflator body 52 to be inserted in the airbag 73, and is of a straight line shape generally along the left-right direction in a state where the airbag 73 has been flatly deployed as a single body. The through-hole 77 is intended to allow the support protrusion 30 formed on the bottom wall portion 29 of the case 28 to be inserted therethrough and is formed between the insertion holes 75 and 75.

Also, in the airbag 73 according to the embodiment, two tethers 81 and 82 for limiting a thickness thereof upon completion of inflation are arranged, in the inside thereof, to be spaced from each other in the upward-downward direction and to extend generally along the lift-right direction (see FIG. 12). The tether 81 is arranged to partition the attaching portion 74 from the protective inflation portion 79 and the tether 82 is arranged to partition the protective inflation portion 79 into upper and lower regions. The tethers 81 and 82 have respectively a plurality of gas flow holes 81*a* and 82*a* formed to allow the inflation gas to flow therethrough.

Next, procedures of mounting the airbag apparatus S of the embodiment on the vehicle will be described. First, the retainer 60 is received in the airbag 73 through the opening slit 76 in such a manner that the bolts 69 are protruded through the insertion holes 75. Subsequently, in a state where the locking claw portion 66 formed on the tubular portion 62 are protruded through the opening slit 76, the airbag 73 is folded to be able to be received in the case 28 and then is wrapped around by a breakable wrapping material, not shown, for preventing collapsing of such a folded state. At this time, a peripheral part of the opening slit 76 is left exposed through the wrapping material.

Then, the inflator body 52 is inserted, at the gas discharging portion 54 side thereof, into the airbag 73 (into the tubular portion 62 of the retainer 60) via the opening slit 76. At this time, the inflator body 52 is inserted until the left end surface 53*f* of the main body portion 53 is abutted against the protruding piece 65 formed on the tubular portion 62 of the retainer 60. Subsequently, the folded airbag 73 and the inflator 51 are received in the case 28 in such a manner that the bolts 69 protrude from the bottom wall portion 29, and then the nuts 70 are fastened to the bolts 69 protruding from the bottom wall portion 29, thereby attaching the airbag 73 and the inflator 51 to the case 28. Upon fastening of the nuts 70, the retainer 60 moves the tubular portion 62, which covers the outer periphery of the inflator body 52, toward the bottom wall portion 29. Also, the inflator body 52 is reversely pressed toward the vehicle rear side in such a manner that the support protrusion 30 formed on the bottom wall portion 29 is abutted at the distal end 30*a* thereof against the outer peripheral surface 53*e* of the middle section 53*d* of the main body portion 53 in the inflator body 52, thereby causing the outer peripheral surface 53*e* of the middle section 53*d* of the main body portion 53 in the inflator body 52 to be abutted against the distal end surface 64*a* of each protrusion 64 of the abutting portion 63 formed in the tubular portion 62. At this time, also, the right end section 53*a* of the main body portion 53 of the inflator body 52, which corresponds to the connection port portion 55 side thereof, is abutted at the outer peripheral surface 53*b* thereof against the guide surfaces 41R and 41R of the guide portion 40R formed on the front edge 39*a* side of the main opening 39R of the connector opening 38R formed in the right wall portion 36R of the case 28, and while the outer peripheral surface 53*b* is kept abutted against the guide surfaces 41R and 41R, the inflator body 52 is moved toward the bottom wall portion 29 and thus supported by the guide portion 40R. The inflator body 52 is retained in the retainer 60 as the middle section 53*d* of the main body portion 53 is sandwiched by the distal end surfaces 64*a* of four protrusions 64 arranged on the vehicle rear side and the distal end 30*a* of one support protrusion 30 arranged on the vehicle front side, and also is attached to the case 28 as a vehicle front side of the right end section 53*a* is supported by the guide portion 40R.

Subsequently, each of the cover wall portions 24 and 25 is inserted in the peripheral wall portion 32 and the corner portions 32*b* of the peripheral wall portion 32 of the case 28 located in the peripheral edge section 32*a* of the protruding opening 28*a* are inserted in the recesses 21*b*. Thus, the airbag cover 16 is arranged on the outer peripheral side of the case 28 so that the protruding opening 28a is covered with the door portion 18. Also, the locking claws 33a and 34a are respectively locked on the peripheral edges of the locking holes 22a and 23a, and then the attaching wall portions 22 and 23 are respectively attached to the upper wall portion 33 and the lower wall portion 34. By mounting the airbag cover 16 on the case 28 in this manner, an airbag assembly can be assembled. Then, the airbag assembly is attached and fixed to the body 1 of the vehicle using the attaching piece portions 46L and 46R, which extend from the left wall portion 36L and the right wall portion 36R of the case 28, and the brackets 4 and 4. Also, the connector 57 to which the lead wire 58 extending from an airbag operation circuit is connected is connected to the connection port portion 55 of the inflator body 52 exposed through the connector opening 38R of the case 28. Subsequently, when the instrument penal 12 or an undercover 13 (see FIGS. 1 and 2) is attached, the airbag apparatus S can be attached to the vehicle.

After the airbag apparatus S has been mounted in the vehicle, an inflation gas is discharged from the gas discharging ports 54a of the inflator body 52 and flowed into the airbag 73 if an operation signal is inputted to the inflator body 52 via the lead wire 58. The airbag 73 is inflated by allowing the inflation gas to be flowed therein, thereby breaking the wrapping material, not shown, and also pressing the door portion 18 of the airbag cover 16. Thus, the door portion 18 is opened in the upward-downward direction using as a pivot center the hinge portions 20, while breaking the breakable portion 19 on the periphery thereof. Then, the airbag 73 protrudes through the protruding opening 28a of the case 28 toward the vehicle rear side, thereby completing inflation thereof as shown by a two-dot chain line in FIGS. 1 and 5.

According to the airbag apparatus S of the embodiment, two cover wall portions 24 and 25 of the side wall portions 21a of the airbag cover 16, which are arranged to oppose each other in the left-right direction, are respectively arranged on inner peripheral sides of the left wall portion 36L and the right wall portion 36R as connection wall portions and also near to the left wall portion 36L and the right wall portion 36R to cover the inner peripheral side of the peripheral wall portion 32 of the case 28 located at the vicinities of corner portions 32b of a peripheral edge of the protruding opening 28a upon deployment and inflation of the airbag 73 (see FIGS. 3 and 4). Therefore, the inflating airbag 73 can be inhibited from coming in contact with parts on the peripheral edge section 32a of the protruding opening 28a of the case 28 located at the vicinities of the corner portions 32b. Also, according to the airbag apparatus of the embodiment, the attaching wall portions 22 and 23 of four side wall portions 21a of the airbag cover 16, which oppose each other in the upward-downward direction, are attached to the case 28 using the locking claws 33a and 34a formed on the upper wall portion 33 and the lower wall portion 34 as locking wall portions of the case 28. Accordingly, the airbag cover 16 can be easily mounted on the case 28.

Therefore, according to the airbag apparatus S of the embodiment, the inflating airbag 73 can be inhibited from coming in contact with the vicinities of the corner portions 32b of the peripheral edge of the protruding opening 28a of the case 28, and also the airbag cover 16 can be easily mounted on the case 28.

Also, according to the airbag apparatus S of the embodiment, the attaching piece portions (attaching portions) 46L and 46R for attaching the case 28 to the body 1 of the vehicle are arranged on the left wall portion 36L and the right wall portion 36R as connection wall portions of the peripheral wall portion 32. Namely, according to the airbag apparatus S of the embodiment, the cover wall portions 24 and 25 of the airbag cover 16 are not arranged cover the outer peripheral sides of the left wall portion 36L and the right wall portion 36R, on which the attaching piece portions 46L and 46R are arranged, but to cover the inner peripheral sides of the left wall portion 36L and the right wall portion 36. Accordingly, as shown in FIG. 3, even if the attaching piece portions 46L and 46R are arranged on the peripheral edge of the protruding opening 28a of the case 28, the left wall portion 36L and the right wall portion 36R can be widely covered with the cover wall portion 24 and 25 without any problems. Therefore, according to the airbag apparatus S of the embodiment, the periphery (inner peripheral side or outer peripheral side) of the peripheral wall portion 32 of the case 28 can be widely covered with four side wall portions 21a (attaching wall portions 22 and 23 and cover wall portions 24 and 25) of the airbag cover 16. As a result, when the door portion 18 is opened upon deployment and inflation of the airbag 73, a gap can be inhibited from being occurred between the airbag cover 16 and the case 28 in an area extending form the peripheral wall portion 32 of the case 28 to the door portion 18 and thus the airbag 73 can be smoothly protruded through the protruding opening 28a. By the way, in a configuration in which the cover wall portions cover the outer peripheral sides of the connection wall portions, if the attaching portions are arranged on the peripheral edge of the protruding opening in the connection wall portions, distal ends of the cover wall portions will be recessed not to be interfered with the attaching portions, thereby occurring a gap between the peripheral wall portion of the case and the cover wall portions. Alternatively, if this is not considered, the attaching portions for attaching the case to the body may be arranged on the locking wall portions, not on the connection wall portions.

In addition, according to the airbag apparatus S of the embodiment, the attaching wall portions 22 and 23 of the airbag cover 16 have a width dimension in a direction along an opening plane of the protruding opening 28a set to be larger than that of the cover wall portions 24 and 25. Accordingly, the airbag cover 16 can be mounted on the case 28 over a wide range along the opening plane of the protruding opening 28a (in the embodiment, a wide range along the left-right direction), thereby allowing the airbag cover 16 to be stably mounted on the case 28. Alternatively, if this is not considered, an airbag cover in which attaching wall portions have a width dimension in a direction along an opening plane of a protruding opening set to be smaller than that of cover wall portions may be employed.

Further, according to the airbag apparatus S of the embodiment, the cover wall portions 24 and 25 are arranged to oppose each other in the left-right direction of the vehicle when being mounted in the vehicle, that is, the attaching piece portions 46L and 46R formed on the peripheral wall portion 32 of the case 28 are arranged to extend outward in the left-right direction. In other words, the attaching piece portions need not be arranged to extend from the locking wall portions (upper wall portion and lower wall portion) of the case, which oppose each other in the upward-downward direction of the vehicle, outward in the upward-downward direction. Therefore, even if a space of an area between the upper wall portion 33 and the lower wall portion 34, i.e., a width dimension thereof in the upward-downward direction is not reduced, the case 28 when being mounted in the vehicle can be hardly interfered with peripheral components arranged in an opposing direction (upward-downward direction) of the upper wall portion 33 and the lower wall portion 34 of the case 28, thereby providing a good workability in mounting the airbag apparatus S to the vehicle. Alternatively, if this is not considered, an airbag cover in which cover wall portions are arranged to oppose each other in an upward-downward direction or a front-rear direction of a vehicle when being mounted in the vehicle may be employed.

Further, according to the airbag apparatus S of the embodiment, the airbag cover 16 has a generally tubular peripheral wall portion 21 configured in such a manner that the attaching wall portions 22 and 23 and the cover wall portions 24 and 25 are connected, at rear end side regions thereof, which correspond to the door portion 18 side thereof, to each other along the circumferential direction of the peripheral wall portion 32 of the case 28. Also, the recesses 21b are arranged in the peripheral wall portion 21 to allow parts of the peripheral wall portion 32 of the case 28, which are located at the vicinities of the corner portions 32b of the peripheral edge section 32a of the protruding opening 28a, to be inserted therein (see FIG. 6). Therefore, by inserting the parts at the vicinities of the corner portions 32b into the recesses 21b, the peripheral edge section 32a of the protruding opening 28a in the peripheral wall portion 32 can be reliably covered with parts on inner peripheral surface 21c sides of the recesses 21b arranged near thereto as shown in FIGS. 8 and 9. Specifically, according to the airbag apparatus of the embodiment, connection wall portion-side sections 32bb in end surfaces of the corner portions 32b of the peripheral edge section 32a of the protruding opening 28a are covered with parts of an outer peripheral surface sides of the cover wall portions 24 and 25 located at both ends thereof in the upward-downward direction, and locking wall portion-side sections 32ba are covered with parts on the inner peripheral surface 21c side of the recesses 21b (see FIGS. 4 and 9). Accordingly, the inflating airbag 73 can be further prevented from coming in contact with the vicinities of the corner portions 32b of the peripheral edge section 32a of the protruding opening 28a of the case 28. Alternatively, if this is not considered, an airbag cover in which attaching wall portions and cover wall portions protrude from the vicinity of a peripheral edge section of a door portion while being separated from each other with a gap arranged therebetween may be employed. Even in a case where the attaching wall portions and the cover wall portions are configured to be separated from each other, if a width dimension of the cover wall portions in the upward-downward direction is set to be slightly smaller than a spacing distance between locking wall portions of the case so that the cover wall portions cover inner peripheral sides of connection wall portions, a gap is hardly occurred between the cover wall portions and the locking wall portions of the case. Therefore, inner peripheral sides of corner portions can be accurately covered with parts on end edge sides of the cover wall portions.

Meanwhile, although, in the embodiment, the knee protection airbag apparatus as the airbag apparatus S has been described by way of example, an airbag apparatus to which the present invention can be applied, is not limited thereto, and for example, the invention can be also applied to an assistant driver's seat airbag apparatus, which is arranged in front of an assistant driver's seat.

What is claimed is:

1. An airbag apparatus comprising:
a case;
an airbag folded and received in the case; and
an airbag cover that covers the folded airbag;
wherein the case has a box shape including a bottom wall portion, a tubular peripheral wall portion extending from a peripheral edge of the bottom wall portion, and a protruding opening through which the airbag inflating by an inflation gas protrudes,
wherein the airbag cover includes:
a door portion arranged to cover the protruding opening and adapted to be pushed and opened by the inflating airbag upon deployment and inflation of the airbag; and
four side wall portions protruding from peripheral edges of the door portion and arranged adjacent the peripheral wall portion of the case,
wherein the peripheral wall portion of the case includes:
two locking wall portions which are opposing to each other and to which the side wall portions of the airbag cover are attached; and
two connection wall portions connecting the two locking wall portions to each other,
wherein each of the locking wall portions has a locking claw in a vicinity of an edge of the locking wall near to the protruding opening, the locking claw protrudes outward and is bent and a distal end of the locking claw extends toward the bottom wall portion;
wherein, as attaching wall portions, a first pair of the four side wall portions oppose each other and are located near to the locking wall portions, the attaching wall portions are arranged on outer peripheral sides of the locking wall portions, the first pair of the four side wall portions have a locking hole, a peripheral edge of the locking hole is locked by the locking claw, and the first pair of the four side walls are attached to the locking wall portions by locking the locking claw on the peripheral edge of the locking hole, and
wherein, as cover wall portions, a second pair of the four side wall portions oppose each other and are arranged adjacent inner peripheral sides of the connection wall portions, the second pair of the four side wall portions cover an inner peripheral side of the peripheral wall portion located at vicinities of corner portions of a peripheral edge of the protruding opening, and the connection wall portions are located on an outer periphery of the cover wall portions.

2. The airbag apparatus according to claim 1, wherein the connection wall portions of the peripheral wall portion are provided with an attaching portion for attaching the case to a body of a vehicle.

3. The airbag apparatus according to claim 2, wherein widths of the attaching wall portions in a direction along an opening plane of the protruding opening is larger than widths of the cover wall portions.

4. The airbag apparatus according to claim 2, wherein the cover wall portions are opposing to each other in a left-right direction of the vehicle when the airbag apparatus is mounted in the vehicle.

5. The airbag apparatus according to claim 1, wherein the attaching wall portions and the cover wall portions are connected to each other along a circumferential direction of the peripheral wall portion to define a tubular shape and also connected to each other while providing recesses allowing parts of the peripheral wall portion, which are located at the vicinities of corner portions of the peripheral edge of the protruding opening, to be inserted therein.

* * * * *